July 26, 1938.  E. K. McNEAL  2,124,925
WINDOW GLASS CLEARING DEVICE
Filed Oct. 7, 1936  2 Sheets-Sheet 1

INVENTOR
Edward K. McNeal
by Parker, Rockwood & Farmer
ATTORNEYS

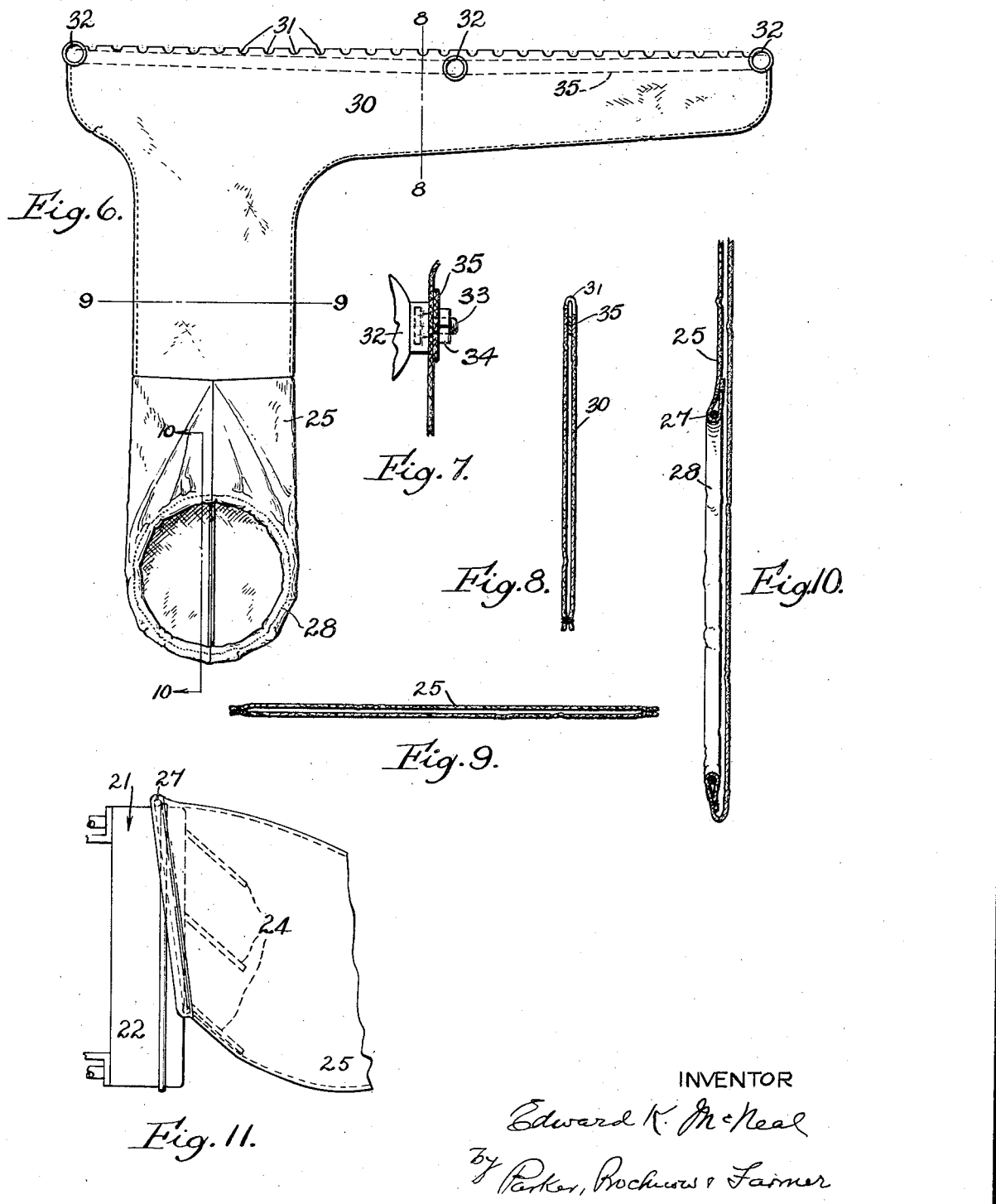

Patented July 26, 1938

2,124,925

UNITED STATES PATENT OFFICE 2,124,925

WINDOW GLASS CLEARING DEVICE

Edward K. McNeal, Syracuse, N. Y.

Application October 7, 1936, Serial No. 104,461

5 Claims. (Cl. 20—40.5)

This invention relates to improvements in devices for removing moisture from and preventing condensation of moisture on window glass, such for example as windshields and windows of automobiles and other vehicles.

One object of this invention is to provide a device of this kind by means of which substantially the entire windshield and large portions of the forward side windows of a vehicle may be kept clear of frost, ice and condensed moisture.

Another object of this invention is to provide a device of this kind of improved and simplified construction which can be readily applied to or removed from its operative position.

Another object of this invention is to provide a device of this kind which when not in use can be readily folded into a small compact bundle, and which can be readily attached to automobile heaters of various sizes and shapes.

A further object of this invention is to provide a device of this kind which may be readily applied to or removed from a heater and a windshield, and which is provided with a large number of discharge openings capable of keeping substantially the entire windshield and portions of the two forward side windows of a vehicle free from ice, frost, or condensed moisture.

Another object of this invention is to provide a device of this kind which is made of readily flexible material and which is so formed as to become inflated when in operation, so that air from the heater will be discharged from the device under pressure and in correct relation to the window glass to be heated.

Other objects of this invention will appear from the following description and claims.

In the accompanying drawings:

Fig. 6 is a front elevation of a heating device embodying this invention and showing the same detached from the heater.

Fig. 7 is a fragmentary sectional elevation showing one manner of connecting a suction cup to the heating device.

Figure 1:
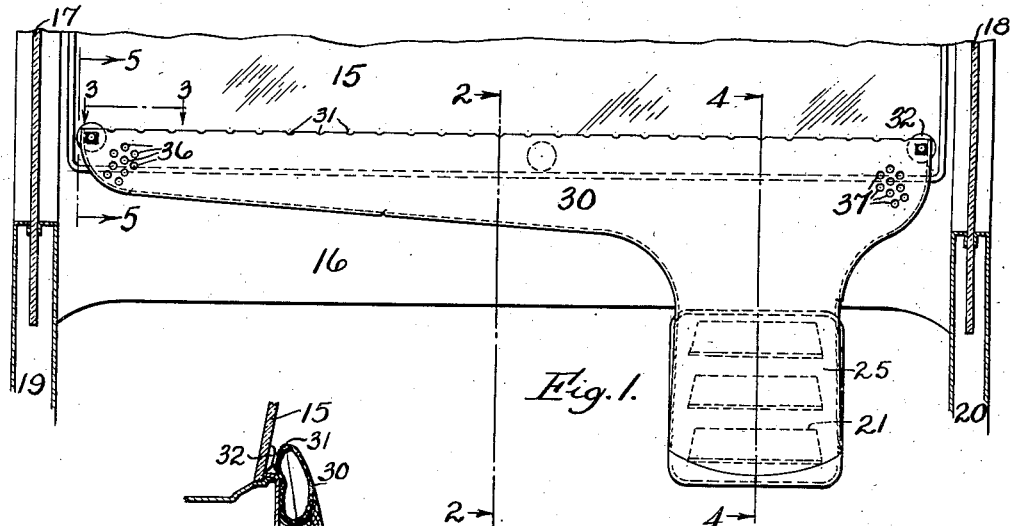
Fig. 1 is a sectional elevation of a vehicle looking forwardly and showing in rear elevation, a heating device embodying this invention.

Figs. 8 and 9 are sections of the heating device when collapsed, and on line 8—8 and 9—9, respectively, Fig. 6.

Fig. 10 is a fragmentary elevation, on line 10—10, Fig. 6.

Fig. 11 is a side elevation of a heater showing my improved heating device applied thereto in such a manner as to receive a portion only of the air discharged from the heater.

My improved device for removing moisture from the windows is herein referred to as a "heating" device, but it will be understood that the device may also be used to direct unheated air against the windows to prevent the formation of moisture thereon and to remove moisture therefrom. The term "moisture" as hereinafter used is intended to include frost and ice as well as condensed drops of moisture.

My improved heating device is illustrated in the accompanying drawings as applied to an automobile, but it will be understood that the heating device is applicable to other vehicles or structures. 15 represents the windshield or front window of the vehicle which is as usual arranged above a dash 16. 17 and 18 represent the opposite side windows, which may be arranged in doors 19 and 20. 21 represents a heater which may be of any suitable or desired construction, that shown being provided with a frame 22 containing suitable heating elements (not shown), such for example as tubes, through which hot water from the engine cooling system may be passed, and 23 represents a fan or other device for impelling or blowing air through the frame 22 and around the heating elements located therein. The front face of the frame 22 of the heater may be provided with the usual louvers or shutters 24. Heaters of other suitable kinds may, of course, be used in place of the one shown, or, if desired, the air supplied to my heating device may be derived from any other suitable source.

In accordance with my invention, the heating device is preferably made of flexible material which is relatively impermeable to air and which may be in the form of a textile material covered or impregnated with a suitable substance for rendering the same relatively gas-tight, or in the form of films or sheets of rubber or other materials. Preferably a light or thin and freely flexible material is employed which can be folded into compact form when not in use and which, when inflated with air, will assume a definite shape or form. This material may be cut into the desired shape and may be then either sewn or stitched into the desired tubular form, or edges of the material may be cemented to form a device of tubular form having an inlet portion which receives air from any suitable source, such as the heater 21 and a discharge portion which may be secured to or arranged in operative relation to the window which is to be kept clear, for example, the windshield in the case of motor vehicles. The discharge portion of the heating device is provided with suitable discharge means through which air is discharged toward a window, such as, for example, a relatively large number of small holes arranged lengthwise of the heating device to direct jets of air to the lower portion of the rear or inner face of the windshield or window, for removing or preventing the condensation and freezing of moisture on the window. The device is preferably also provided at its ends with apertures facing in the direction of the side windows 17 and 18, for the purpose of keeping at least portions of these windows clear of moisture. When warm air is admitted to the device from a heater and is directed by the discharge openings of the device toward the window, the glass thereof becomes heated which facilitates and expedites the removal of moisture from the inner faces of the windows and also melts any frozen moisture that may be present on the inner and outer faces of the windows.

The heating device may be secured to the heater 21 in any suitable or desired manner. Preferably, an air receiving tube or duct 25 of the heating device is provided at its end with an opening having a draw string 27, which may be in the form of an elastic cord, arranged therein in such a manner that the receiving end 28 of the heating device may be readily stretched about all or a part of the frame 22 of the heater. Other means for securing the receiving end of the heating device to a heater or other source of air to receive air therefrom may, of course, be used.

The air receiving tube or duct 25 is of sufficient length to reach from the heater to approximately the lower portion of the window or windshield to be kept clear, and at this point the tube or duct 25 is extended laterally to form an air discharge portion 30 which is approximately of the length of the windshield or other window to be heated, and which is provided in the upper portion thereof with a plurality of holes or apertures 31 through which air may be discharged upwardly toward the inner face of the windshield 15.

The air discharge portion of the heating device may be attached in operative relation to the window to be cleared, in any suitable or desired manner, and in the particular construction illustrated, I have shown the same removably attached to the windshield by means of rubber suction cups 32 of usual construction. These suction cups may be secured to the discharge portion 30 of the heating device in any suitable manner, for example, by means of bolts 33 partly embedded in the rubber cups. The bolts extend through one or both layers of the material of the heating device and nuts 34 hold the fabric on the suction cups. One suction cup near each end of the device is usually sufficient to support the device on a windshield, but if desired, a third cup may be used intermediate the end cups. If desired, the heating device may be reinforced at the portions thereof to which the suction cups are secured, and for this purpose, a ribbon or strip 35 of fabric is arranged lengthwise of the upper portion 30 of the heating device, as shown in Figs. 6 to 8 and the fastening devices 33 preferably pass through the strips 35 as well as through the material of the heating device, so that danger of tearing the material of which the heating device is made, is reduced to a minimum. This reinforcing strip may, however, be omitted as shown in Figs. 1 to 5.

In addition to the line of discharge apertures 31 through which air is discharged against the windshield 15, I preferably provide at opposite ends of the upper porton 30 of the heating device and on the back face thereof a plurality of apertures 36 and 37 through which air from the interior of the portion 30 will be discharged rearwardly and laterally toward the side windows 17 and 18, thus keeping large portions of these windows clear of moisture. When the tubular member is inflated, these apertures will be so positioned as to direct jets of air toward the side windows in a widely flaring blast or jet, by reason of their position in the convex rear wall, as clearly shown in Figs. 3 and 5. These jets upon striking the side windows will be spread out so as to cover and keep clear large parts of these windows, particularly the parts thereof through which the driver most frequently looks.

Figure 2:
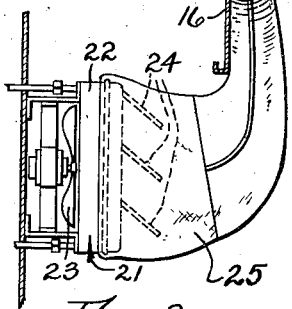
Fig. 2 is a sectional elevation thereof, on line 2—2, Fig. 1.
Figure 3:
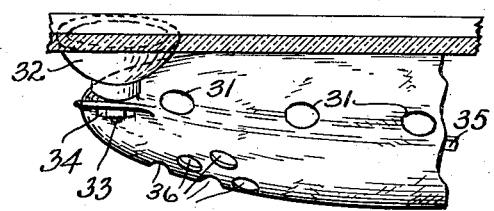
Fig. 3 is a fragmentary sectional plan view thereof, on an enlarged scale, partly in section on line 3—3, Fig. 1.
Figure 4:
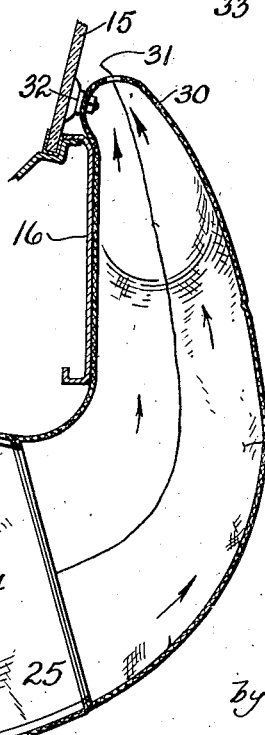
Fig. 4 is a sectional elevation thereof, on line 4—4, Fig. 1.
Figure 5:
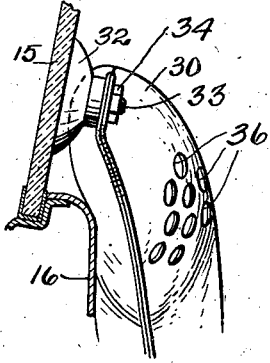
Fig. 5 is a fragmentary end view of the heating device, the windshield being shown partly in section, on line 5—5, Fig. 1.

In the use of my improved window heating device, whenever need for the device arises, it can very quickly be placed in its operative position by first stretching the opening at the air receiving end thereof about the heater frame 22, as shown in Figs. 2 and 4, and the upper portion of the device may then be very quickly attached to the lower portion of the windshield 15. When the switch to the heater fan is turned on, the device will immediately become inflated with air and will assume the inflated positions approximately as shown in Figs. 1 to 5. The air is, consequently, discharged under pressure produced by the fan 23 through the upper apertures 31 toward the windshield 15, as clearly shown in Figs. 1, 2 and 4. Any moisture or frost which may have formed on the inside of the windshield will be quickly evaporated by the air flowing against the windshield, also by heating the glass, the ice on the outside is melted. The jets of air will tend to spread over the surface of the glass in rising and will, consequently, remove moisture from practically the entire windshield, this being particularly the case with the sloping type of windshields now commonly used in automobiles. Simultaneously with the removal of moisture from the windshield 15, air is discharged from the apertures 36 and 37 toward the side windows 17 and 18, thus removing moisture from the front portions of the side windows. This provides the driver with clear vision through the entire windshield and also through the front portions of the side windows, vision through which portions is very essential to safe driving. When it is not necessary to discharge all of the air from the heater to the windshield and side windows and when it is desired to use a portion of the air from the heater for discharging warm air to the space near the floor of the vehicle, the receiving end of the heating device may be applied to the heater, as shown in Fig. 11, by stretching the same around a portion only of the frame 22 of the heater, and for this purpose, the device may be stretched around the upper portion of this frame and one or other of the deflectors or vanes 24. The portion of the face of the heater below such vane will then discharge warm air into the lower portion of the vehicle body to heat the interior of the same.

When the device is no longer needed, it can be rendered inoperative by turning off the heater switch or by removing the receiving portion 25 from the air discharge face of the heater 21, whereupon the device will become deflated, as shown in Figs. 6 to 10 inclusive, and will occupy very little space at the dash of the vehicle. If desired, however, the device may quickly be entirely removed by releasing the holding means, such as the suction cups, whereupon the device may be folded into a very small and compact space for storing until future use.

In the construction of heating devices of the type described, it is desirable to so construct the devices that the total cross sectional area of all of the apertures or air discharge means of the device is less than the cross sectional area of the air supply duct or passage 25, or in other words, so that the volume of air discharged by the jets from all of the apertures will be less than that which the heater fan is capable of supplying, so that a pressure will be built up within the heating device. This keeps the device in an inflated condition, as shown in Figs. 2 to 5 inclusive, and ensures that the various discharge apertures will be in correct relation to the windshield and side windows of the vehicle. This pressure within the device also ensures a sufficient velocity and volume of discharge of air from the apertures so that each jet of air contacts a substantial area of window glass, and furthermore, substantially the same volume of air is discharged through holes farthest removed from the intake portion 25 as through holes nearest thereto.

The device described has the advantages that it very effectively removes moisture from windows and prevents condensation and freezing of moisture, not only on the windshield but also on the side windows. This adds greatly to the safety with which motor vehicles may be operated during sleet or cold weather. By heating the windows, ice and snow is prevented from adhering to the outer surfaces thereof and during clear cold weather, the moisture in the air within the vehicle cannot condense on the inner parts of the windows with which air from the device contacts. If moisture has already condensed or frozen on a window before the device is in operation, such moisture is quickly removed when the device is placed into operation. Furthermore, when heated air is discharged through the device, such air, after removing moisture, or preventing the deposit of moisture, serves the further purpose of heating the interior of the vehicle more effectively than the heater alone can do, since the air discharged against the windshield and side windows is deflected back over the front seat to the rear of the vehicle. The device herein described has the further advantage over other defrosters now in use in that it will not crack the glass for the reason that the air discharged is not of a temperature sufficiently high to crack glass.

The term "window clearing device" as employed in the claims is intended to include a device for heating the window as well as one by means of which air which is not heated is directed to the windows or windshield, and also applies to the device whether used for clearing accumulated moisture from a windshield or window or for keeping the windshield or window clear.

I claim as my invention:

1. A window glass clearing device for use with a heater having an air discharge, said device including an inflatable tubular member of thin flexible material having an air inlet portion adapted to be applied to the air discharge of a heater, and an air discharge portion of relatively large cross sectional area arranged to be secured to and extend lengthwise of the lower portion of a window so as to depend therebelow substantially throughout the length of the window and having apertures in the upper part thereof through which air may be discharged at the window in an upward direction toward and along the inner face of the window.

2. A windshield clearing device including a tubular member of flexible material adapted to be secured in operative relation lengthwise of and close to the lower edge of a windshield and having discharge apertures close to said windshield through which air may pass toward said windshield, a reinforcing tape secured to the portion of said device which extends adjacent to said windshield, means secured to said tape for attaching said tubular member in operative relation to a windshield, and means for supplying air to said tubular member.

3. A window glass clearing device for use with a heater for clearing a windshield and side windows of a vehicle, including an inflatable tubular member of flexible material having an air inlet portion adapted to be applied to a heater to receive air therefrom under pressure, and an inflatable discharge portion closed at opposite ends and extending lengthwise of the lower edge of a windshield and having discharge orifices formed in the material in the upper part thereof through which air is discharged in an upward direction toward the inner face of the windshield, the flexible material of which said inflatable discharge portion is made being curved when inflated by the air pressure within to thereby provide a convexed rear wall, and said curved rear wall having formed therein adjacent said opposite closed ends of said discharge portion a plurality of apertures disposed transversely of said convexity, through which air may be discharged as a widely flaring blast towards and over the surface of said side windows.

4. A window glass clearing device for use with a heater for clearing a windshield and side windows of a vehicle, including an inflatable tubular member of flexible material having an air inlet portion adapted to be applied to a heater to receive air therefrom under pressure, and an inflatable discharge portion closed at opposite ends and extending lengthwise of the lower edge of a windshield, the flexible material of which said inflatable discharge portion is made being curved when inflated by the air pressure within to thereby provide a convexed rear wall, and said curved rear wall having formed therein adjacent said opposite closed ends of said discharge portion a plurality of apertures disposed transversely of said convexity, through which air may be discharged as a widely flaring blast towards and over the surface of said side windows.

5. A window glass clearing device for use with a heater having an air discharge, said device including an inflatable tubular member of thin flexible material having an air inlet portion adapted to be applied to the air discharge of a heater, an air discharge portion of relatively large cross sectional area arranged to be secured to and extend lengthwise of the lower portion of a window so as to depend therebelow substantially throughout the length of the window and having apertures in the upper part thereof through which air may be discharged at the window in an upward direction toward and along the inner face of the window, and said air discharge portion having a suction cup secured to each end thereof, whereby said air discharge portion may be stretched across the windshield and attached to and held in operative relation upon the windshield, being maintained in stretched condition whether inflated or uninflated.

EDWARD K. McNEAL.